US009475358B2

(12) United States Patent
Grim

(10) Patent No.: US 9,475,358 B2
(45) Date of Patent: Oct. 25, 2016

(54) SUSPENSION BUSHING

(71) Applicant: YUSA CORPORATION, Washington Court House, OH (US)

(72) Inventor: Wendell Thomas Grim, Washington Court House, OH (US)

(73) Assignee: YUSA CORPORATION, Washington Court House, OH (US)

( * ) Notice: Subject to any disclaimer, the term of this patent is extended or adjusted under 35 U.S.C. 154(b) by 0 days.

(21) Appl. No.: 14/432,633

(22) PCT Filed: Oct. 5, 2012

(86) PCT No.: PCT/US2012/058975
§ 371 (c)(1),
(2) Date: Mar. 31, 2015

(87) PCT Pub. No.: WO2014/055084
PCT Pub. Date: Apr. 10, 2014

(65) Prior Publication Data
US 2015/0273967 A1   Oct. 1, 2015

(51) Int. Cl.
*F16F 5/00* (2006.01)
*B60G 13/02* (2006.01)
(Continued)

(52) U.S. Cl.
CPC ............... *B60G 13/02* (2013.01); *B60G 7/02* (2013.01); *F16F 1/393* (2013.01); *B60G 2204/143* (2013.01); *B60G 2204/1431* (2013.01); *B60G 2204/1432* (2013.01); *B60G 2204/41* (2013.01); *B60G 2204/4104* (2013.01); *B60G 2206/122* (2013.01)

(58) Field of Classification Search
CPC .......... F16F 1/3863; F16F 15/00; F16F 1/38; F16F 13/14; B60G 3/20; B60G 7/00; B60G 7/02; B60G 7/001; B60G 7/006; B60G 2206/011; B60G 2206/72; B60G 2206/73; B60G 2206/91; B60G 2206/124; B60G 2204/148
USPC ....... 267/140.12, 140.13, 141.1–141, 7, 268, 267/269, 276, 293; 280/124.144, 124.145; 403/122, 133
See application file for complete search history.

(56) References Cited

U.S. PATENT DOCUMENTS 3,392,971 A   7/1968 Herbenar et al.
5,887,859 A   3/1999 Hadano et al.
(Continued)

OTHER PUBLICATIONS

International Search Report, Date of mailing: Jan. 4, 2013.

*Primary Examiner* — Christopher Schwartz
(74) *Attorney, Agent, or Firm* — Rankin, Hill & Clark LLP

(57) ABSTRACT

A suspension bushing includes an inner cylinder, an intermediate plate, an outer cylinder and an elastic member. An axis of the inner cylinder is arranged vertically and the inner cylinder is provided with an expanded portion in an axially central region. The expanded portion is enclosed by a curved surface section formed in an axially central region of the intermediate plate. An axially outward expanded end section is provided on either side of the curved surface section. An inside annular recess and an outside annular recess are provided on an axially outward end of the elastic member. When the twist is inputted, the outer cylinder and the intermediate plate are changed relative to the inner cylinder. However, due to the provision of the expanded end section, a twist angle is increased so that the intermediate plate is hard to interfere with an end portion of the inner cylinder.

10 Claims, 7 Drawing Sheets

(51) Int. Cl.
   *B60G 7/02*   (2006.01)
   *F16F 1/393*  (2006.01)

(56) References Cited

U.S. PATENT DOCUMENTS

| | | | |
|---|---|---|---|
| 5,938,220 A | 8/1999 | Torneld | |
| 5,967,668 A * | 10/1999 | Germano | B60G 7/02 267/293 |
| 6,224,046 B1 * | 5/2001 | Miyamoto | B60G 3/202 267/140.12 |
| 7,246,807 B2 | 7/2007 | Katagiri et al. | |
| 8,282,305 B2 * | 10/2012 | Rechtien | F16C 11/0614 384/203 |
| 8,505,889 B2 * | 8/2013 | Suzuki | B60G 3/20 267/141.1 |
| 2002/0060385 A1 * | 5/2002 | Mayerbock | B60G 7/02 267/293 |
| 2005/0153781 A1 * | 7/2005 | Buhl et al. | F16F 1/3863 464/89 |
| 2008/0284076 A1 | 11/2008 | Miyahara et al. | |

* cited by examiner

SUSPENSION BUSHING

TECHNICAL FIELD

The present invention relates to a cylindrical suspension bushing for use in a suspension of a motor vehicle, and more particularly to the suspension bushing of vertical type that an axial direction of a cylinder extends in an upward and downward direction of the vehicle.

By the way, in the following description, a direction parallel to a central axis (a central axis of an inner cylinder) of the cylindrical suspension bushing is defined as an axial direction while a direction orthogonal to the central axis thereof is defined as a radial direction.

BACKGROUND ART

A suspension bushing of vertical type that establishes a connection between a body of a motor vehicle and a suspension arm in a vibration isolation manner is publicly known. It is comprised of an inner cylinder and an outer cylinder provided coaxially and spaced apart from each other in an inner and outer direction, and an elastic member for elastically coupling these inner and outer cylinders, and an axis of the suspension bushing extends in an upward and downward direction of the vehicle. This type of the suspension bushing is disclosed in U.S. Pat. No. 5,938,220, for example.

Such suspension bushing of vertical type has a tendency to increase a twist that the inner cylinder and the outer cylinder are inclined relative to each other. When the twist spring that is the spring in a twisting direction is increased in spring, it is easy to feel a stiff feeling thereby to easily decrease a riding comfort. Therefore, to cope with this twist, there are some cases where the spring in a direction orthogonal to the axis is strengthened by expanding an intermediate portion in the axial direction of the inner cylinder into a spherical shape and the twist spring is decreased by forming annular recesses of a hollow concave shape on axial end portions of the elastic member, thereby to improve the riding comfort.

Such suspension bushing is disclosed in U.S. Pat. No. 5,887,859 though there is no description about the vertical type, for example. FIG. 7 shows the same structure as a suspension bushing described in this patent document. This suspension bushing 120 is comprised of an inner cylinder 122, an outer cylinder 124, an intermediate plate 126, and an elastic member 150, 152 for functioning as a vibration isolating core element by elastically connecting these component elements.

A reference character 115 denotes a mounting portion provided on a suspension arm. The suspension bushing is mounted by press-fitting the outer cylinder 124 into a mounting hole 116 which passes through the mounting portion 115. A bolt (not shown in the drawing) is fitted into an axially extending through hole of the inner cylinder 122 thereby to be mounted on the vehicle body (not shown).

In a central region in an axial direction of the suspension bushing 120, there is provided an expanding portion 130 which projects outward in a radial direction. On the intermediate plate 126 corresponding to the expanding portion 130, there is provided a curved surface portion 140 which faces the expanding portion 130 and has a concave curved surface for accommodating the same. On both axial end portions between the inner cylinder 122 and the intermediate plate 126, annular recesses 154 of a concave shape are provided such that a portion of the elastic member 150 is hollowed in an axially central direction. Moreover, similar annular recesses 156 are provided between the intermediate plate 126 and the outer cylinder 124. The depths in the axial direction of these annular recesses 154 and 156 reach the locations of the expanding portion 130 and the curved surface portion 140, respectively. In addition, a length in an axial direction of the inner cylinder 122 is longer than the outer cylinder 124 and the intermediate plate 126.

With the structure as above, the spring in a direction A orthogonal to a central axis C of the inner cylinder 122 can be strengthened. Also, when the inner cylinder 122 and the outer cylinder 124 are inclined relative to each other through input of the twist, since the twist spring is decreased by the existence of the annular recesses 154,156, the inner cylinder 122 is easy to be inclined (hereinafter, the description shall be given such that the inner cylinder 122 is inclined relative to the outer cylinder 124).

PRIOR ART REFERENCES

Patent reference 1: U.S. Pat. No. 5,938,220.
Patent reference 2: U.S. Pat. No. 5,887,859.

DISCLOSURE OF THE INVENTION

Problem to be Solved by the Invention

In the structure of the above prior art, when the inner cylinder 122 is inclined through the input of the twist, the inner cylinder 122 interferes with the axial end portion of the intermediate plate 126 while crushing the annular recess 154. At that time, the central axis C is inclined at a twist angle θ1 to a location of B1. Up to this state, the twist spring is decreased by the existence of the hollowed annular recess 154, and the inner cylinder 122 can be easily inclined.

However, in the case where the still larger twist is inputted after interference with the intermediate plate 126, the central axis C of the inner cylinder 122 is inclined at a larger twist angle θ2 to a location of B2 while the inner cylinder 122 crushes the annular recess 156 together with the intermediate plate 126.

Since the inclination from the twist angle θ1 to the twist angle θ2 is accompanied by the inclination of the intermediate plate 126, the twist spring is increased though there is the annular recess 156. Therefore, it is required to increase the twist angle θ1 as large as possible before the inner cylinder 122 interferes with the intermediate plate 126.

Further, in the above described prior art, since each of the axial end portions of the intermediate plate 126 extends in parallel with each of the axial end portions of the inner cylinder 122, the inner cylinder 122 interferes with the intermediate plate 126 at a comparatively small twist angle θ1. The twist angle θ1 may be simply increased by widening a space between the inner cylinder 122 and the intermediate plate 126, but it makes the whole suspension bushing larger.

Further, in the above prior art, the annular recesses 154, 156 are formed at an even depth and in a comparatively large size so as to decrease the twist spring. When the volume of the elastic member 150, 152 in the axial direction is reduced, the elastic member 150, 152 is decreased in spring in the axial direction because with respect to an input in the axial direction the shear deformation substantially parallel to the input direction mainly occurs and the compression deformation is limited.

On the other hand, in the suspension bushing of vertical type and the like, it is necessary to increase the spring in the axial direction since the input in the axial direction is big.

Therefore, it is also required to make the volume in the axial direction of the elastic member 150, 152 larger so as to increase the spring in the axial direction.

Then, in order to strengthen the spring in the axial direction, as shown by a phantom line D in the drawing, it is thought that the elastic member 150,152 is expanded toward both end portions in the axial direction thereby making the volume larger (making the annular recess 156 shallower). However, in this case, the twist spring when applying a twist angle θ to the inner cylinder 122 is increased thereby decreasing the riding comfort.

Moreover, at the time of an input of the twist, a stress strain is caused in the vicinity of the intermediate plate 126 in this expanded region whereby a crack E or the like is liable to occur. Thus, there are cases where the durability is lowered.

Further, as shown by a phantom line F, it is also thought that both end portions of the outer cylinder 124 are narrowed and deformed so as to allow the elastic member 150, 152 to be compressed in relation to the input in the axial direction whereby the spring in the axial direction is increased. In this case, after forming the elastic member 150, 152, the processing for narrowing the outer cylinder 124 must be added, thereby causing an increase in man-hour.

By the way, when the suspension bushing is the vertical type, the input of the twist is increased and the input in the axial direction by the upward and downward vibration becomes larger, so that requirements with respect to a decrease in the twist spring and an increase in the spring in the axial direction become conspicuous.

It is therefore an object of the present invention to provide a suspension bushing that, in the case of providing the intermediate plate, the interference with the intermediate plate is hard to occur and the twist angle is increased as large as possible.

It is another object of the present invention to provide a suspension bushing that decreases the spring in the twisting direction while reducing the stress strain thereby to improve the durability.

It is a further object of the present invention to provide a suspension bushing that is easy to work and that is suitable for the vertical type suspension bushing.

Means for Solving the Problem

To solve the above described problems, a suspension bushing according to a first aspect of the present invention comprises an inner cylinder 22, an outer cylinder 24 being arranged apart from the inner cylinder 22 while surrounding an outer circumference thereof, an intermediate plate 26 being arranged between and spaced apart from the inner cylinder 22 and the outer cylinder 24, an elastic member 28 elastically connecting the inner cylinder 22, the intermediate plate 26 and the outer cylinder so as to function as a vibration isolating core element, wherein the elastic member 28 has an inside section 50 provided between the inner cylinder 22 and the intermediate plate 26, and an outside section 52 provided between the intermediate plate 26 and the outer cylinder 24, wherein the inner cylinder 22 has an expanded portion 30 provided on an intermediate region in an axial direction and projecting outward in a direction orthogonal to an axis thereof, and end portions 34 of small diameter provided on both ends in the axial direction, and wherein the intermediate plate 26 has a curved surface section 40 which encloses the expanded portion 30, and an expanded end section 44 which surrounds the end portion 34 and which is inclined such that an outward portion in the axial direction is gradually spaced apart from the end portion 34.

According to a second aspect of the present invention, the intermediate plate 26 has a most approaching portion 42 most approaching the inner cylinder 22, in a connected region between the curved surface section 40 and the expanded end section 44, wherein a volume increasing portion 58 of the elastic member 28 which fills in a concave of the intermediate plate 28 provided outward in an axially orthogonal direction of the most approaching portion 42 is formed continuously integral with the outside section 52 of the elastic member 28.

According to a third aspect of the present invention, the most approaching portion 42 is formed in a round shape.

According to a fourth aspect of the present invention, the expanded end section 44 has a curved surface which is curved convexly outward in an axially orthogonal direction.

According to a fifth aspect of the present invention, the inside section 50 is provided with inside annular recesses 54 extending inward from each of axial ends, in an overlapping position with the end portion 34, while the outside section 52 is provided with outside annular recesses 56 extending inward from each of axial ends, in an overlapping position with the expanded end section 44.

According to a sixth aspect of the present invention, a bottom 56a of the outside annular recess 56 is different in position from a bottom 54a of the inside annular recess 54 so as to be located outward in the axial direction in relation to the latter.

According to a seventh aspect of the present invention, the bottom 54a of the inside annular recess 54 is located inward in the axial direction in relation to the most approaching portion 42 while the bottom 56a of the outside annular recess 56 is located outward in the axial direction in relation to the most approaching portion 42.

According to an eighth aspect of the present invention, the end portion 34 is covered with an inner cylinder end extension cover portion 53 which is integral with the inside section 50.

According to a ninth aspect of the present invention, a length in an axial direction of the outer cylinder 24 is shorter than a length in an axial direction of the intermediate plate 26 and an axial end of the outer cylinder 24 is located axially inward in relation to an axial end of the intermediate plate 26.

According to a tenth aspect of the present invention, the suspension bushing is a vertical type that a central axis C of the inner cylinder 22 is arranged to extend in an upward and downward direction of the vehicle body.

Effects of the Invention

According to the first aspect of the present invention, since the intermediate plate 26 has the expanded end section 44 which surrounds the end portion 34 and which is inclined such that the outward portion in the axial direction thereof is gradually spaced apart from the end portion 34, even if the intermediate plate 26 and the outer cylinder 24 are inclined large relative to the inner cylinder 22 by an input in a twisting direction, the intermediate plate 26 can be inclined large up to the time when the expanded end section 44 interferes with the inner cylinder 22, whereby it is possible to be inclined as large as an inclination amount of the expanded end portion 44.

Therefore, in the case of providing the intermediate plate 26, the interference with the intermediate plate 26 is hard to occur thereby allowing the twist angle θ to be increased so that it is possible to decrease the spring constant in the twist direction whereby the riding comfort can be improved.

According to the second aspect of the present invention, since there is provided the most approaching portion 42 in the connected region between the curved surface section 40 and the expanded end section 44 of the intermediate plate 26, the volume increasing portion 58 of the elastic member 28 which fills in the concave of the intermediate plate 26 provided outward in the axially orthogonal direction of the most approaching portion 42 can be formed continuously integral with the outside section 52 of the elastic member 28 so that the volume of the outside section 52 in the axial direction can be increased. With this structure, in the axial direction, the spring can be further increased by the volume increasing portion 58.

Therefore, without strengthening the spring in the twisting direction so much, the spring in the axial direction can be increased.

Moreover, by the provision of the expanded end portion 44, the spring in the axial direction is accompanied by the compression deformation in the axial direction of the volume increasing portion 58 whereby the spring can be further increased.

In addition, since time and effort to bend an axial end of the outer cylinder so as to strengthen the spring in the axial direction is not required, the manufacture may be simplified.

According to the third aspect of the present invention, since the most approaching portion 42 is formed in a round shape, the stress strain in the volume increasing portion 58 can be reduced thereby improving the durability.

According to the fourth aspect of the present invention, since the expanded end section 44 has a curved surface which is curved convexly outward in the axially orthogonal direction, the stress strain in the volume increasing portion 58 can be further reduced, and an expansion degree of the intermediate plate 26 is gradually decreased toward the end in the axial direction so that the space relative to the outer cylinder 24 can be maintained at predetermined dimensions.

Therefore, in a cross sectional view in the axial direction, the outer cylinder 24 gets hard to interfere with the intermediate plate 26 and the twist angle in relation to the inner cylinder 22 can be increased in comparison with the case where the expanded end section 44 is expanded in the shape of a simple straight line.

According to the fifth aspect of the present invention, since there are provided the inside annular recess 54 and the outside annular recess 56, the spring in the twisting direction can be decreased.

In addition, since the outside annular recess is provided in the overlapping position with the expanded end section 44, the outer cylinder 24 can be easily inclined toward the intermediate plate 26 at the time of the twist.

According to the sixth aspect of the present invention, since the bottom 56a of the outside annular recess 56 is different in position from the bottom 54a of the inside annular recess 54 so as to be located outward in the axial direction in relation to the bottom 54a, the volume of the volume increasing portion 58 can be increased enough, and when twisting, the expanded end section 44 of the intermediate plate 26 is easy to be inclined in such a manner as to crush the outside annular recess 56.

According to the seventh aspect of the present invention, since the bottom 54a of the inside annular recess 54 is located inward in the axial direction in relation to the most approaching portion 42 while the bottom 56a of the outside annular recess 56 is located outward in the axial direction in relation to the most approaching portion 42, when twisting, the outer cylinder 24 is inclined so as to approach the expanded end section 44 of the intermediate plate 26, whereby it is easy to allow the expanded end section 44 of the intermediate plate 26 to be inclined so as to approach the end portion 34 of the inner cylinder 22.

According to the eighth aspect of the present invention, since the end portion 34 is covered with the inner cylinder end extension cover portion 53 which is integral with the inside section 50, when twisting, noises may not occur in the case where the inside of the expanded end section 44 is inclined toward and comes in contact with the end portion 34 of the inner cylinder 22.

According to the ninth aspect of the present invention, since the length in the axial direction of the outer cylinder 24 is shorter than the length in the axial direction of the intermediate plate 26 and the axial end of the outer cylinder 24 is located inward in the axial direction in relation to the axial end of the intermediate plate 26, when twisting, the twist angle up to which the expanded end portion 44 does not interfere with the outer cylinder 24 can be increased enough.

According to the tenth aspect of the present invention, since the suspension bushing of the present invention as described above can be increased in the twist angle and strengthened in the spring in the axial direction, it is suitable for the vertical type of which the central axis C of the inner cylinder extends in the upward and downward direction.

BEST MODE FOR CARRYING OUT THE INVENTION

Hereinafter, the embodiment of a suspension bushing will be described with reference to the accompanying drawings.

Figure 1:
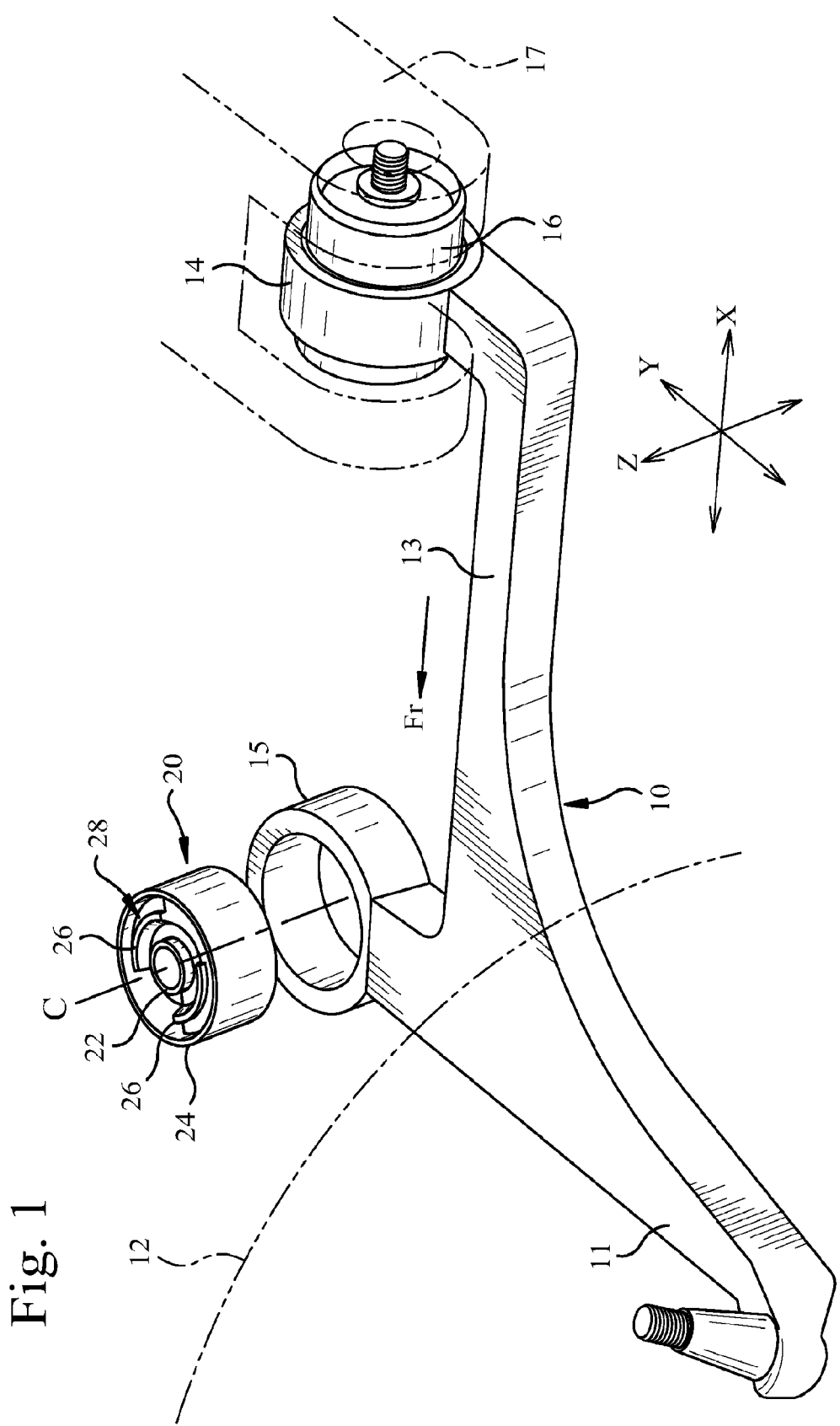
FIG. 1 is a view showing a mounting structure of a suspension bushing on a suspension arm.

FIG. 1 is a view showing a mounting structure of a suspension bushing on a suspension arm. A forward and backward direction of a vehicle is referred to as X, a right and left direction thereof being referred to as Y, and an upward and downward direction is referred to as Z. In addition, a forward direction is referred to especially as Fr. Further, An X and Y direction corresponds to a radial direction of the suspension bushing, and similarly, a Z direction corresponds to an axial direction thereof.

The suspension arm 10 supports a wheel 12 with a transverse arm 11 extending in the Y direction. A rear side mounting portion 14 and a front side mounting portion 15 are provided each in a cylindrical shape on a rear end and a front end of a forward and backward arm 13.

On the rear side mounting portion 14, a cylindrical suspension bushing 16 not covered by the present invention is mounted with its axis extending transversely in the X direction and is supported by a vehicle body side member 17. Into the front side mounting portion 15, a cylindrical suspension bushing 20 covered by the present invention is fitted and arranged vertically with its axis extending in the upward and downward direction substantially along the Z direction. Not shown in the drawing but the suspension bushing 20 has an inner cylinder (referred to later) which is mounted on a vehicle body side.

The suspension arm 10 rotates about an axis (parallel to the X direction) of the suspension bushing 16 in response to an upward and downward movement of the wheel 12. Then, the suspension bushing 20 receives a lot of inputs in an axial direction and in a twisting direction.

Figure 2:
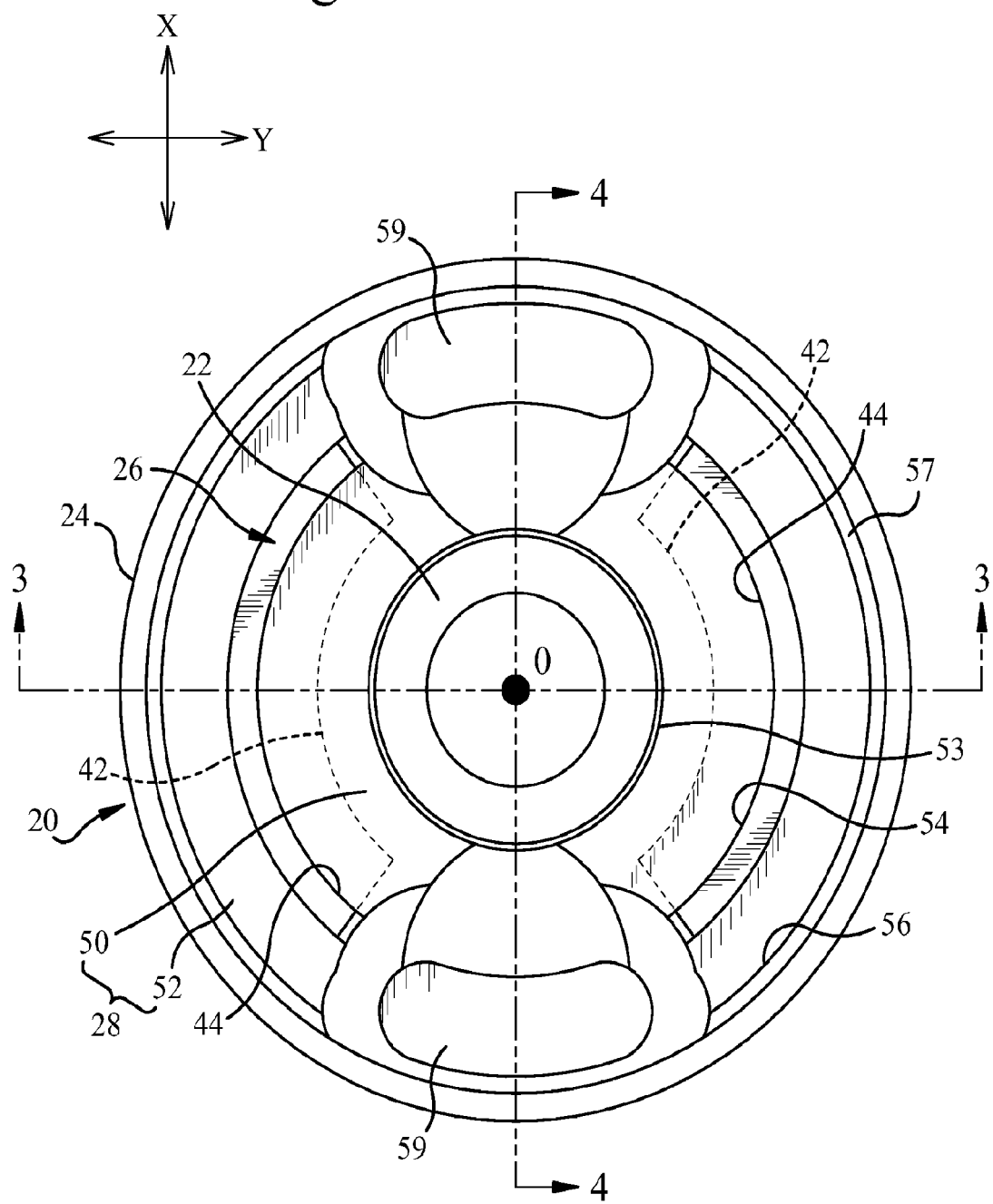
FIG. 2 is a plan view showing the suspension bushing in an axial direction.
Figure 3:
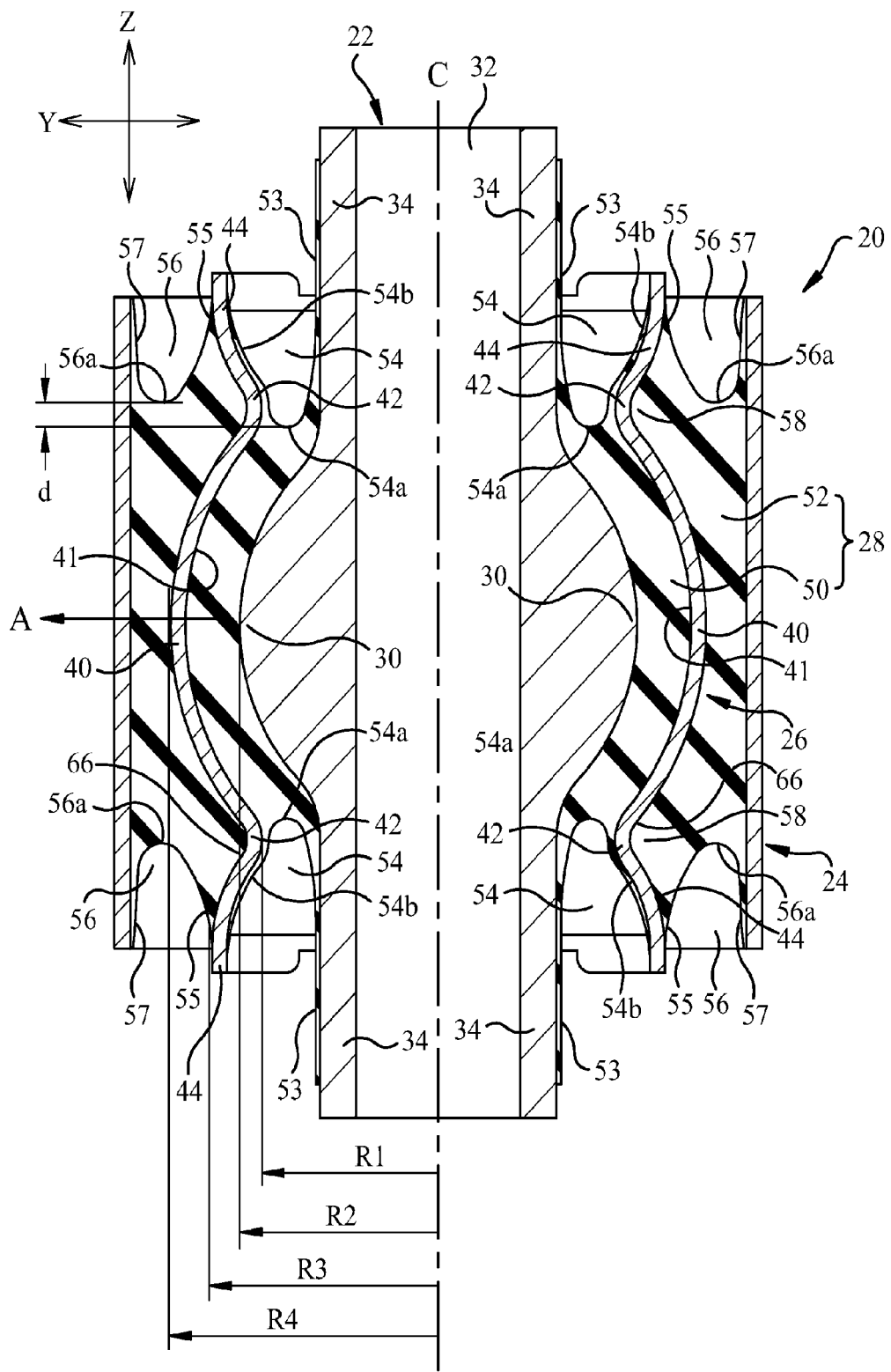
FIG. 3 is a cross sectional view taken along line 3-3 of FIG. 2.
Figure 4:
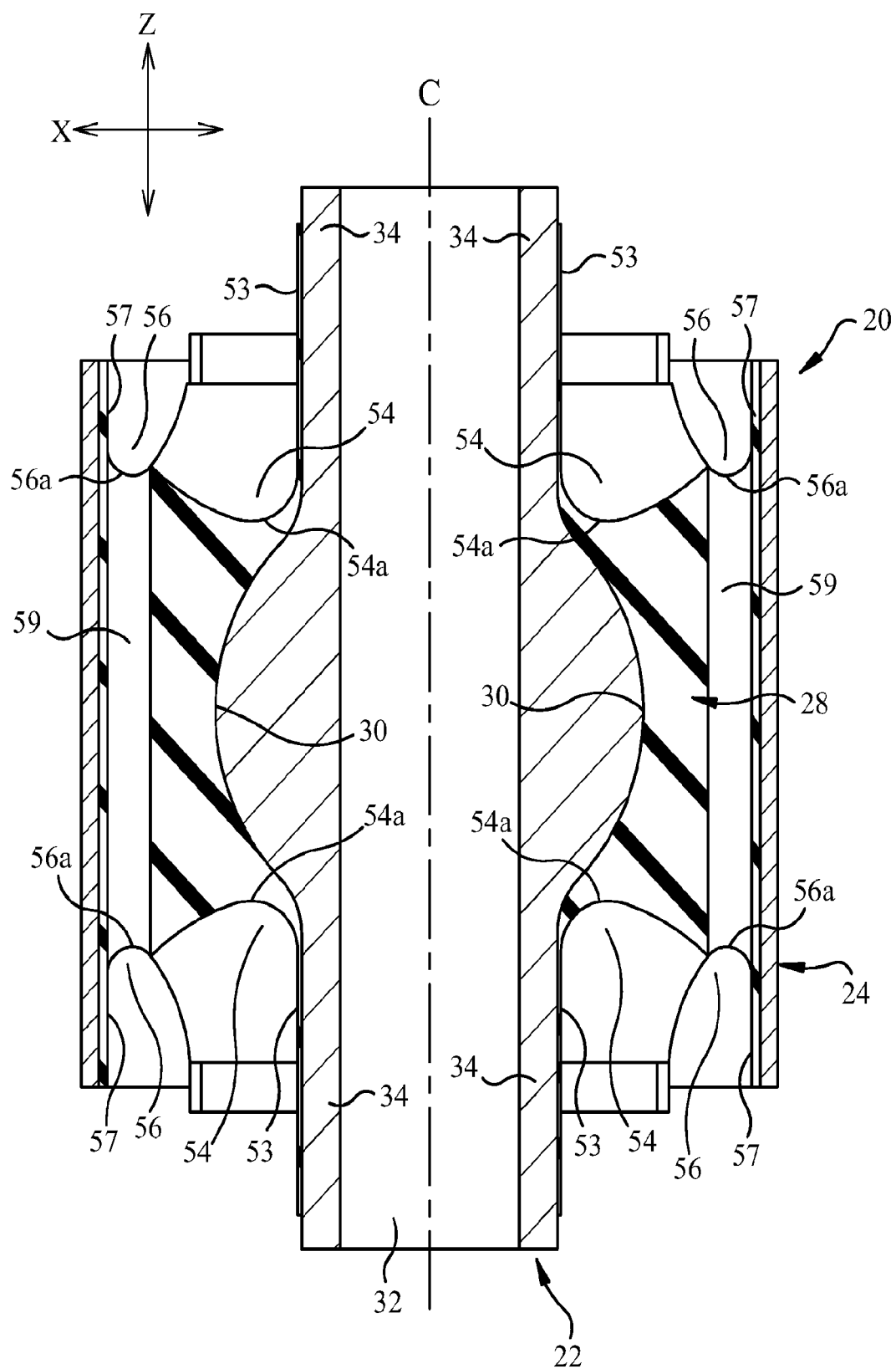
FIG. 4 is a cross sectional view taken along line 4-4 of FIG. 2.
Figure 5:
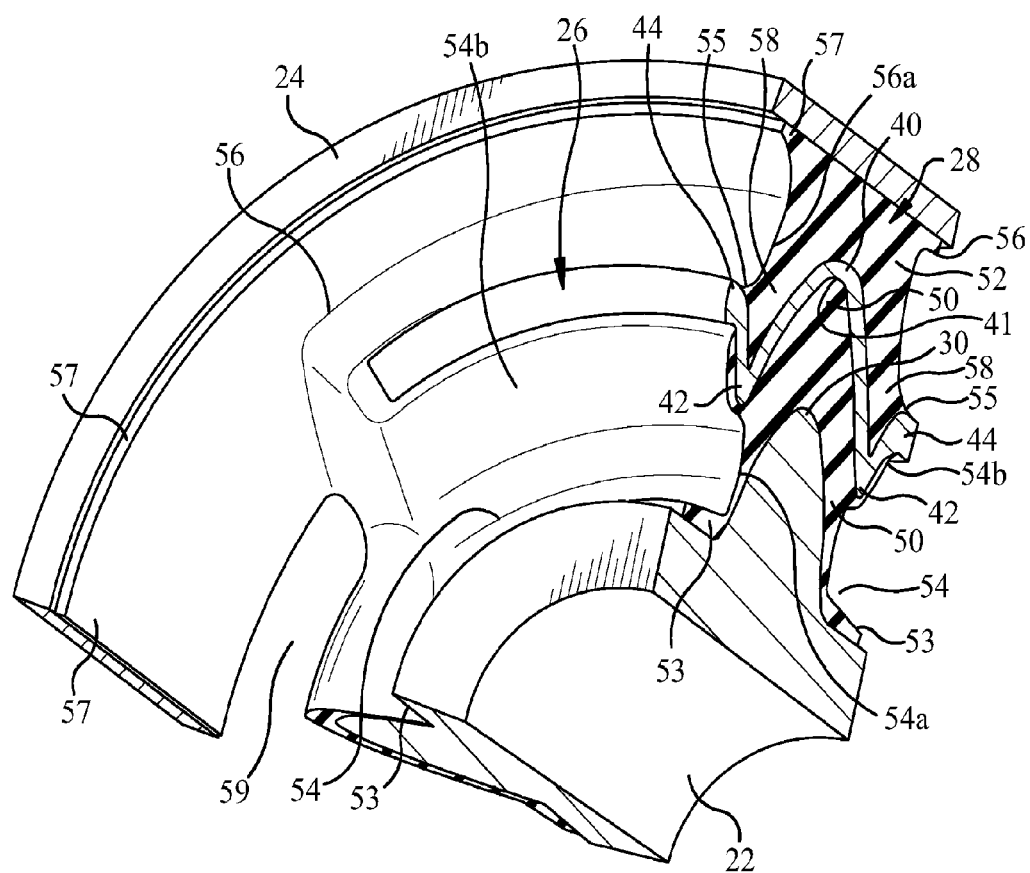
FIG. 5 is a perspective view of ¼ cut portion taken along line 3-0-4 of FIG. 2.
Figure 6:
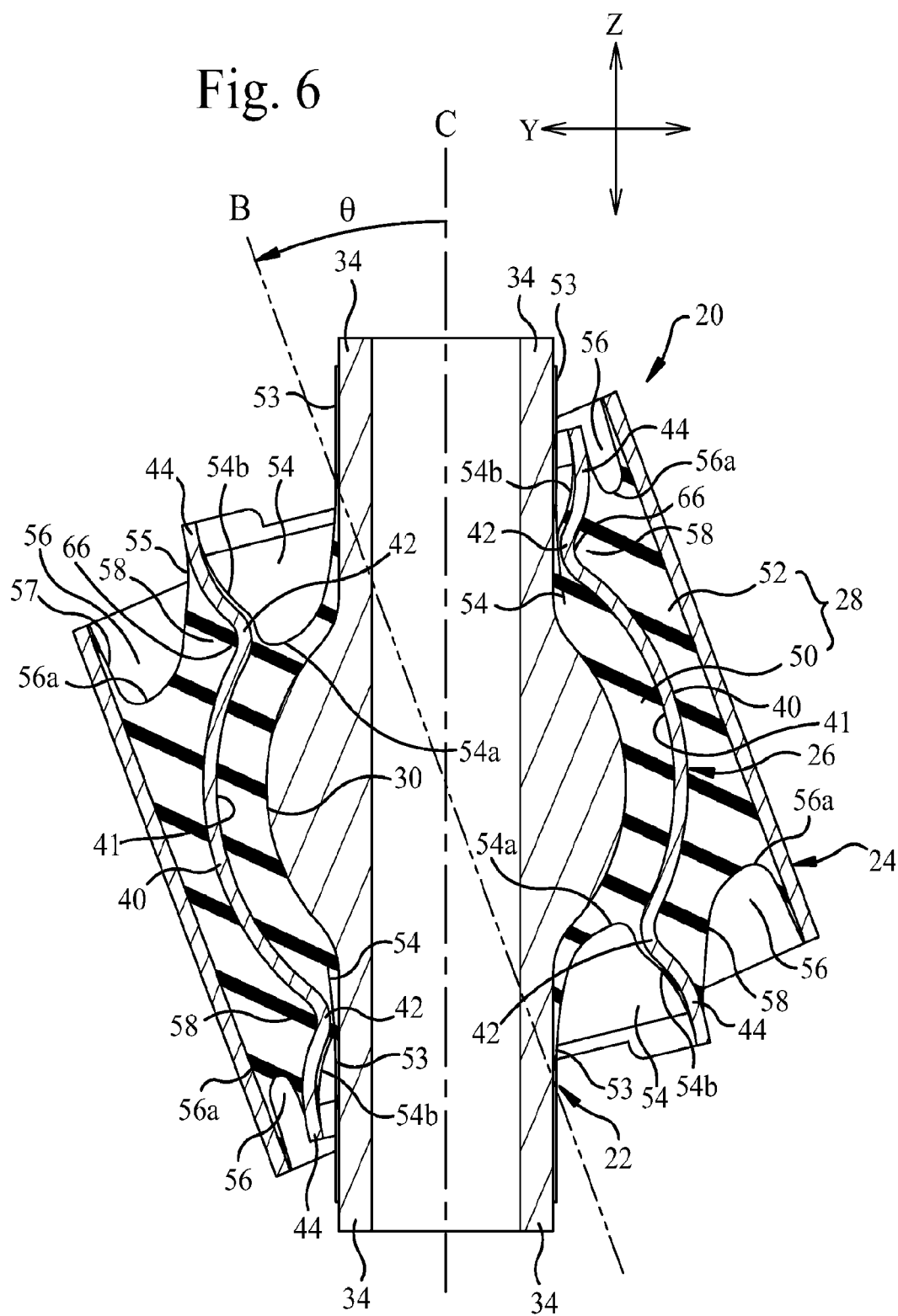
FIG. 6 is a view showing a state of inputting the twist in FIG. 3.

FIG. 2 is a plan view showing the suspension bushing 20 in an axial direction. FIG. 3 is a cross sectional view taken along line 3-3 of FIG. 2. FIG. 4 is a cross sectional view taken along line 4-4 of FIG. 2. FIG. 5 is a perspective view of ¼ cut portion taken along line 3-0-4 of FIG. 2. FIG. 6 is a view showing a state of inputting the twist in FIG. 3.

In these drawings, the suspension bushing 20 is comprised of an inner cylinder 22, an outer cylinder 24, an intermediate plate 26, and an elastic member 28 for elastically connecting these component elements. The inner cylinder 22 and the outer cylinder 24 are formed in a cylindrical shape, respectively. The inner cylinder 22 is substantially concentrically arranged inside the outer cylinder 24 while spacing apart from the outer cylinder 24. The intermediate plate 26 is arranged in a substantially intermediate location between the inner cylinder 22 and the outer cylinder 24.

By the way, a central axis C of the inner cylinder 22 corresponds with a central axis of the suspension bushing 20. The axial directions of the suspension bushing 20 and the inner cylinder 22 are a direction parallel to the central axis C of the inner cylinder 22.

The inner cylinder 22 is made of rigid materials such as metal and the like to be formed by casting, forging, etc. and, in a central region in the axial direction thereof, is integrally provided with an expanded portion 30 which projects spherically outward in the radial direction. A surface of the expanded portion 30 is formed as a spherical surface which has a center on or in the vicinity of the central axis C of the inner cylinder 22. By the way, the expanded portion 30 is not necessarily limited to the spherical shape, and various projecting shapes may be adopted.

An axial hole 32 which passes through in the axial direction is provided in an axial center portion of the inner cylinder 22, and the inner cylinder 22 is configured to be mounted on the vehicle body side through a bolt passing through the axial hole 32. On both sides in the axial direction of the expanded portion 30 there are provided axial end portions 34 which are smaller in diameter than the expanded portion 30.

The outer cylinder 24 is made of rigid materials such as metal and the like to be formed by a proper method such as drawing, press molding, etc. and has a straight cylindrical shape without varying its inner and outer diameters in the axial direction.

The intermediate plate 26 is made of rigid materials such as metal and the like to be formed by a proper method such as press molding, etc. When viewed in the axial direction, the intermediate plate 26 is formed with a pair of halves facing each other, each of which is formed by dividing an imaginary circle which is concentric with the inner cylinder 22, into substantially halves.

A section along a circumferential direction of the imaginary circle is in the shape of a circular arc, and a direction along this circular arc is referred to as a circumferential direction.

By the way, between the intermediate plates 26 neighboring in the circumferential direction there are provided non-continuous portions and the intermediate plates 26 are opposed to each other in the Y direction. The non-continuous portions are filled with the elastic member 28.

In a central region in the axial direction of the intermediate plate 26 is provided a curved surface section 40 which faces the expanded portion 30 and which surrounds the same while spacing apart therefrom. The curved surface section 40 is curved outward in the radial direction and forms a spherical concave section 41 on the inside thereof. In this spherical concave section 41, the expanded portion 30 is arranged in an opposed relationship with the spherical concave section 41 while being spaced apart therefrom. The spherical concave section 41 has a spherical surface which is substantially parallel with a surface of the expanded portion 30. However, it is not necessarily limited to a spherical surface.

On both sides of the curved surface section 40 there are provided most approaching portions 42 which most approach the end portion 34 in the vicinity of a boundary region between the expanded portion 30 and the end portion 34 of the inner cylinder 22 so as to make a space from the central axis C in the radial direction minimum. Moreover, expanded end sections 44 are continuously provided outward from the most approaching portions 42 in the axial direction.

The most approaching portion 42 is formed in a round shape projecting inward in the radial direction and connected continuously to the curved surface section 40 and the expanded end section 44. The most approaching portion 42 forms an intermediate plate outer circumferential concave 66 which opens outward in the radial direction between the curved surface section 40 and the expanded end section 44 and which extends in a circumferential direction.

Since the curved surface section 40 and the expanded end section 44 are curved convexly outward in the radial direction while the most approaching portion 42 is curved convexly inward in the radial direction, the intermediate plate 26 is formed in the shape of an approximately wavy curved surface in an axial cross section (FIG. 3).

By the way, a radius R2 of a maximum outer diameter portion of the expanded portion 30 around the central axis C is larger than a distance R1 from the central axis C to the most approaching portion 42, so that the maximum outer diameter portion of the expanded portion 30 penetrates far outward in the radial direction beyond the most approaching portion 42 into an inside of the spherical concave section 41. The arrangement like this becomes possible when the intermediate plate 26 is formed by being divided into substantially halves.

The expanded end section 44 is formed to be expanded while gradually increasing the space from the central axis C in an axially outward direction from the most approaching portion 42. However, since the expanded end section 44 has a convexly curved shape in a radially outward direction, the increasing rate of the space from the central axis C decreases with approach to the outward in the axial direction, and an outer end in the axial direction of the expanded end section 44 is substantially parallel to the end portion 34 of the inner cylinder 22.

A tip end (an outermost end in the axial direction) of the expanded end section 44 is largest in diameter. A distance R3 of the tip end from the central axis C is larger than the maximum radius R2 of the expanded portion 30 and is approximately equal to or smaller than a maximum radius R4 of the curved surface section 40 in a region corresponding to the maximum radius portion of the expanded portion 30. By the way, the expanded end section 44 is not necessarily formed in a curved shape and it may be a straight shape which is inclined at a predetermined angle to the central axis C in a cross section in the axial direction.

Further, a length in the axial direction of the outer cylinder 24 is shorter than a length in the axial direction of the intermediate plate 26, so that an axial tip end of the outer cylinder 24 is located inside of an axial tip end position of the intermediate plate 26 in the axial direction.

The elastic member 28 is made of proper materials such as rubber and the like and functions as a vibration isolating core element by elastically connecting the inner cylinder 22 and the intermediate plate 26 as well as the intermediate plate 26 and the outer cylinder 24. The elastic member 28 is comprised of an inside section 50 provided between the inner cylinder 22 and the intermediate plate 26 and an outside section 52 provided between the intermediate plate 26 and the outer cylinder 24.

The inside section 50 and the outside section 52 are formed simultaneously and integrally by pouring the rubber material, for example, among the inner cylinder 22, the intermediate plate 26 and the outer cylinder 24 so as to vulcanize and bond these component elements together. In this case, different materials which differ in physical properties such as degree of hardness and the like may be used for the inside section 50 and the outside section 52 as a combination of different materials. Then, the inside section 50 and outside section 52 are formed separately by pouring, etc.

In the inside section 50, there are provided inside annular recesses 54 which are hollow recesses extending from both axial ends to the expanded portion 30. Each of the inside annular recesses 54 overlaps with the end portion 34. In a portion of the inside section 50 surrounding the inside annular recess 54, there are provided a thin inner cylinder end extension cover portion 53 which covers continuously and integrally a surface of the end portion 34 of the inner cylinder 22, and a thin expanded end inside extension cover portion 54b which covers a inner circumferential surface of the expanded end portion 44 of the intermediate plate 26.

An axially outward end of the inner cylinder end extension cover portion 53 is located in a position extending outward longer than an axially outward end of the intermediate plate 26, and it is located outward in the axial direction in relation to an axially outward end of the outer cylinder 24. Similarly, an axially outward end of the expanded end inside extension cover portion 54b is located inward in the axial direction in relation to each of axially outward ends of the inner cylinder end extension cover portion 53 and the intermediate plate 26, and it is located inward in the axial direction in relation to the axially outward end of the outer cylinder 24.

The outside section 52 elastically connects the outer cylinder 24, the curved surface section 40 of the intermediate plate 26 and the expanded end sections 44 on both sides in the axial direction thereof. The outside section 52 has outside annular recesses 56 extending inward from both ends in the axial direction thereof. These outside annular recesses 56 each overlap with the expanded end sections 44.

A depth in the axial direction of the outside annular recess 56 is shallower than the inside annular recess 54. The outside annular recess 56 does not reach the most approaching portion 42 and is stopped in an axially outward position thereof.

Accordingly, a bottom 54a of the inside annular recess 54 and a bottom of the outside annular recess 56 are different in position by a space d in the axial direction such that the bottom 56a of the outside annular recess 56 is located outward in the axial direction in relation to the bottom 54a of the inside annular recess 54.

In other words, the bottom 54a of the inside annular recess 54 and the bottom 56a of the outside annular recess 56 are located on either side of the most approaching portion 42 such that the bottom 54a of the inside annular recess 54 is located inside the most approaching portion 42 in the axial direction while the bottom 56a of the outside annular recess 56 is located outside the most approaching portion 42 in the axial direction.

Further, a portion of the outside section 52 is provided with a volume increasing portion 58 which fills in the most approaching section 42. The volume increasing portion 58 is formed continuously integral with the outside section 52 and fills in the outer circumferential concave 66 of the intermediate plate 26 which is provided between the curved surface section 40 and the expanded end section 44 on either side of the most approaching portion 42 in the axial direction.

A portion of the volume increasing portion 58 is provided with a thin expanded end outside extension cover portion 55 which extends to an axial end of the expanded end portion 44 so as to cover the same.

Similarly, a portion of the outside section 52 is provided with a thin outer cylinder end extension cover portion 57 which covers an inner circumferential surface of the outer cylinder 24 and which extends to an axial end thereof.

An axially outward end of the expanded end outside extension cover portion 55 is located axially outside in relation to the axially outward end of the expanded end inside extension cover portion 54b so as to extend to substantially the same position as the axially outward end of the outer cylinder 24. An axially outward end of the outer cylinder end extension cover portion 57 is located axially inside in relation to each of the axially outward ends of the expanded end inside extension cover portion 54b, the expanded end outside extension cover portion 55 and the outer cylinder 24.

As shown in FIG. 4, there is provided an axially extending through annular recess 59. A pair of annular recesses 59 is provided on either side of the inner cylinder 22 in the X direction as shown in FIG. 2. Each of the annular recesses 59 is in communication with the outside annular recesses 56. Namely, the annular recess 59 forms a continuing portion of the outside annular recess 56. Due to this annular recess 59, the outside section 52 of the elastic member 28 separates the intermediate plate 26 and the outer cylinder 24 in the X direction so that the spring in the X direction is considerably weakened thereby to form a great spring ratio in each of the directions of X·Y·Z.

By the way, the elastic member 28 elastically connects the intermediate plate 26 and the outer cylinder 24 by the outside section 52 thereof in the Y direction while elastically connecting the intermediate plate 26 to the inner cylinder by the inside section 50 thereof. Like this, the region that the elastic member 28 elastically connects the inner cylinder 22 and the outer cylinder 24 is formed symmetrically in the Y direction on either side of the inner cylinder 22. This region is defined as an elastic leg. This elastic leg structure contributes to the directional control of the spring ratio.

Next, the operation will be described hereunder.

FIG. 6 shows a state that the twist has inputted into the suspension bushing 20. In accordance with the swinging motion of the suspension arm 10, the twist is inputted into the suspension bushing 20 and the outer cylinder 24 is inclined relative to the inner cylinder 22. FIG. 6 shows the state at that time, and the outer cylinder 24 is inclined the twist angle θ from the central axis C to the central axis B in relation to the inner cylinder 22.

At first, in a state that the twist is not inputted, the axis of the outer cylinder 24 corresponds with the axis C of the inner cylinder 22 and is in parallel with the Z direction. In this state, when an up and down movement in parallel with the Z direction is inputted, the inner cylinder 22 and the outer cylinder 24 are moved relative to each other in the axial direction.

Then, the outside section 52 is compressed in the axial direction by the expanded end section 44 since there is the volume increasing portion 58 which is provided within the outer circumferential concave 66 of the intermediate plate 26 located between the expanded end section 44 and the curved surface section 40 in the axial direction.

Figure 7:
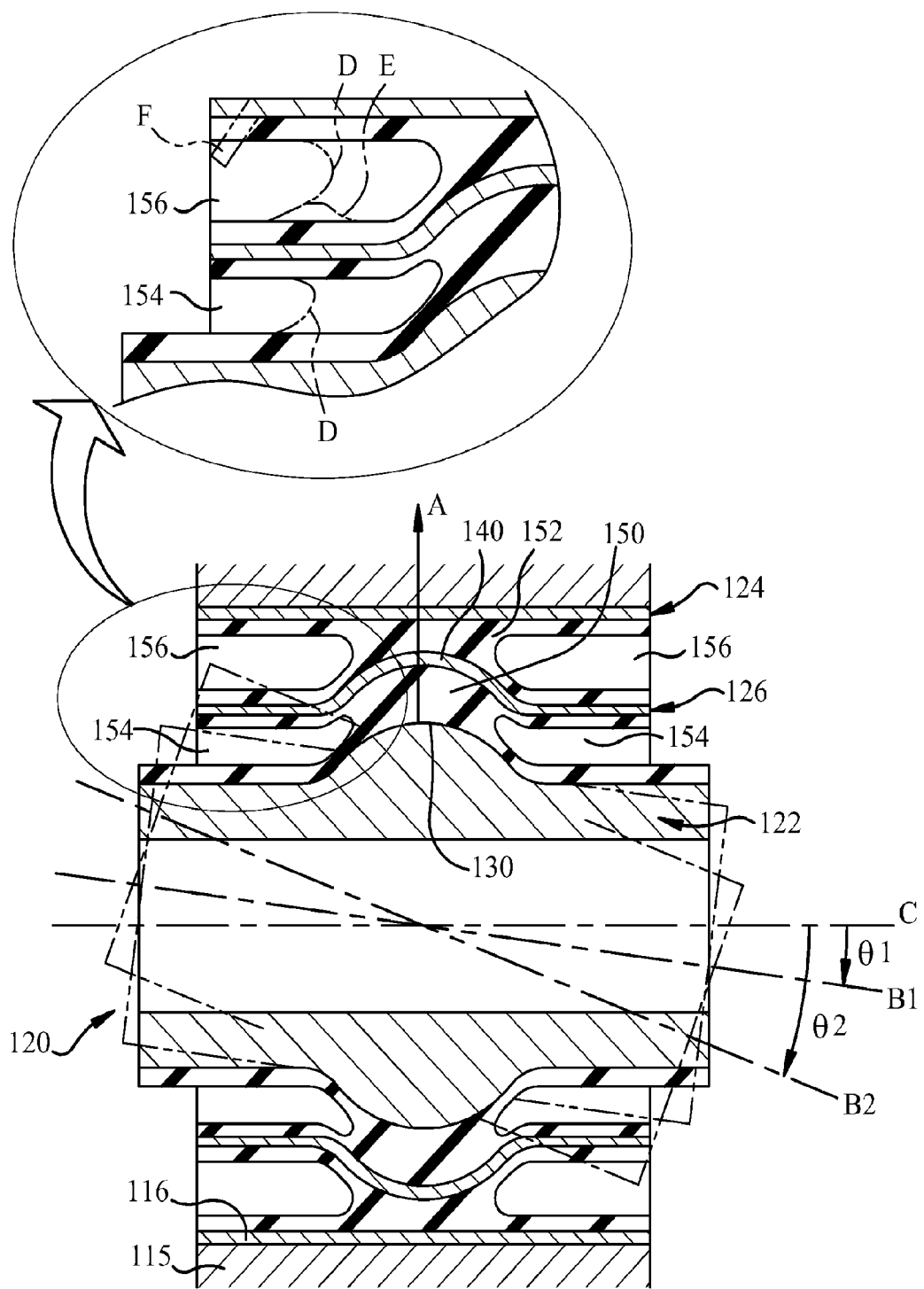
FIG. 7 is a cross sectional view of the prior art.

As a result, the spring in the axial direction of the suspension bushing 20 is able to be increased by making use of the compression deformation of the volume increasing portion 58. Namely, in the case where the axial end of the intermediate plate 126 is horizontal as in the prior art shown in FIG. 7, for example, most of the deformation in the axial direction of the elastic member 152 is the shear deformation, so that the spring in the axial direction is decreased. In comparison with this, when the expanded end portion 44 is provided as in the present invention, the volume increasing portion 58 is compressed and deformed in the axial direction, so that the spring in the axial direction of the suspension bushing 20 becomes considerably large. Therefore, due to the existence of the expanded end section 44, the spring in the axial direction of the suspension bushing 20 can be increased.

Further, since the curved surface section 40, the most approaching portion 42 and the expanded end section 44 are connected by the wavy curved surface, the stress strain relative to the volume increasing portion 58 can be reduced.

In addition, since the elastic leg comprised of the intermediate plate 26, the inside section 50 and the outside section 52 is formed in the Y direction, the spring becomes highest in the deformation in the Y direction.

Furthermore, in the X direction, as shown in FIGS. 2 and 4, since the annular recess 59 is provided and the intermediate plate 26 is not existent, the spring is comparatively low.

Then, when the twist is inputted, the outer cylinder 24 is inclined at the twist angle θ to the inner cylinder 22, as shown in FIG. 6. At that time, due to the input of the twist, the outer cylinder 24 and the intermediate plate 26 can be rotated through the spherical surfaces of the curved surface section 40 and the expanded portion 30.

Moreover, during the rotation of the outer cylinder 24, the end portion of the outer cylinder 24 pushes the expanded end section 44 inward in the radial direction toward the inner cylinder end portion 34. At that time, since the inside annular recess 54 extends inward in the vicinity of the expanded portion 30, the end portion 34 is inclined rapidly so as to crush the inside annular recess 54, and the axial tip of the end portion 34 comes closer to the inside of the expanded end section 44 while crushing the inside annular recess 54 almost completely.

Further, the outside annular recess 56 is also crushed by the expanded end section 44. However, since the outside annular recess 56 is smaller (shallower) than the inside annular recess 54, the big crush does not occur.

Due to the crush of the inside annular recess 54 and the outside annular recess 56, the spring in the twisting direction can be decreased.

In addition, since the expanded end section 44 is being expanded, the inclination angles of the outer cylinder 24 and the intermediate plate 26 are increased up to the position that the expanded end section 44 interferes with the inner cylinder 22, so that the twist angle θ can be increased.

Accordingly, the interference between the end portion 34 of the inner cylinder 22 and the expanded end section 44 of the intermediate plate 26 is hard to occur, so that the spring in the twisting direction can be decreased.

Further, even if the interference occurs, since there is the inner cylinder end extension cover portion 53 of the elastic member 28 lying between the end portion 34 of the inner cylinder 22 and the expanded end section 44, it functions as a cushion, so that the generation of the noise can be prevented.

When the still larger twist is inputted in the state that the end portion 34 of the inner cylinder 22 and the expanded end section 44 interfere with each other, the outer cylinder 24 is further inclined relative to the intermediate plate 26 while crushing the outside annular recess 56, whereby the twist angle θ is further increased. Then, since the volume increasing portion 58 is formed in the outside section 52 of the elastic member 28 by making the outside annular recess 25 smaller (shallower) than the inside annular recess 54, the spring in the twisting direction is increased. Therefore, by changing the spring in the twisting direction conspicuously nonlinearly, the proper spring can be provided in response to the size (the twist angle θ) of the twist such that a considerably high spring is created against the large deformation relative to the large twist.

Furthermore, since the volume increasing portion 58 is formed on the most approaching portion 42 of a curved surface shape and the expanded end section 44, it is possible to decrease the stress strain of the volume increasing portion 58 at the time of the input of the twist and at the time of the input in the axial direction.

DESCRIPTION OF REFERENCE CHARACTERS

20: Suspension bushing, 22: Inner cylinder, 24: Outer cylinder, 26: Intermediate plate, 28: Elastic member, 30: Expanded portion, 34: End portion, 40: Curved surface section, 42: Most approaching portion, 44: Expanded end section. 50: Inside section, 52: Outside section, 54: Inside annular recess, 56: Outside annular recess, 58: Volume increasing portion.

What is claimed is:
1. A suspension bushing comprising:
   an inner cylinder 22;
   an outer cylinder 24 surrounding an outer circumference of the inner cylinder 22 and being spaced apart from the inner cylinder 22;
   an intermediate plate 26 being arranged between and spaced apart from the inner cylinder 22 and the outer cylinder 24;
   an elastic member 28 elastically connecting the inner cylinder 22, the intermediate plate 26 and the outer cylinder so as to function as a vibration isolating core element, wherein the elastic member 28 has an inside section 50 provided between the inner cylinder 22 and the intermediate plate 26 and an outside section 52 provided between the intermediate plate 26 and the outer cylinder 24;

wherein the inner cylinder 22 has an expanded portion 30 provided in an intermediate region thereof in an axial direction and projecting outward in a direction orthogonal to an axis of the inner cylinder 22, and end portions 34 of small diameter provided on both ends in the axial direction; and wherein the intermediate plate 26 has a curved surface section 40 which encloses the expanded portion 30, and an expanded end section 44 which surrounds the end portion 34 and which is inclined such that an outward portion in the axial direction is gradually spaced apart from the end portion 34.

2. A suspension bushing according to claim 1, wherein the intermediate plate 26 has a most approaching portion 42 from which a distance in an axially orthogonal direction relative to the inner cylinder 22 is minimum, in a connected region between the curved surface section 40 and the expanded end section 44, and wherein a volume increasing portion 58 of the elastic member 28 which fills in a concave of the intermediate plate 28 provided outward in an axially orthogonal direction of the most approaching portion 42 is provided continuously integral with the outside section 52 of the elastic member 28.

3. A suspension bushing according to claim 2, wherein the inside section 50 is provided with inside annular recesses 54 extending inward from each of axial ends, in an overlapping position with the end portion 34, while the outside section 52 is provided with outside annular recesses 56 extending inward from each of axial ends, in an overlapping position with the expanded end section 44.

4. A suspension bushing according to claim 3, wherein a bottom 56a of the outside annular recess 56 is different in position from a bottom 54a of the inside annular recess 54 so as to be located outward in an axial direction in relation to the bottom 54a of the inside annular recess 54.

5. A suspension bushing according to claim 4, wherein the bottom 54a of the inside annular recess 54 is located inward in the axial direction in relation to the most approaching portion 42 while the bottom 56a of the outside annular recess 56 is located outward in the axial direction in relation to the most approaching portion 42.

6. A suspension bushing according to claim 3, wherein the end portion 34 is covered with an inner cylinder end extension cover portion 53 which is integral with the inside section 50.

7. A suspension bushing according to claim 2, wherein the most approaching portion 42 is formed in the shape of round.

8. A suspension bushing according to claim 1, wherein the expanded end section 44 has a curved surface which is curved convexly outward in an axially orthogonal direction.

9. A suspension bushing according to claim 1, wherein a length in an axial direction of the outer cylinder 24 is shorter than a length in an axial direction of the intermediate plate 26, and wherein an axial end of the outer cylinder 24 is located axially inward in relation to an axial end of the intermediate plate 26.

10. A suspension bushing according to claim 1, wherein the suspension bushing is a vertical type that a central axis C of the inner cylinder 22 is arranged to extend in an upward and downward direction of the vehicle body.

* * * * *